United States Patent Office 3,671,217
Patented June 20, 1972

3,671,217
PLANT GROWTH REGULANTS
Joseph Rene Brepoels, Heppen, Limbourg, and Armand August Florent Busschots, Sint-Truiden, Limbourg, Belgium, assignors to S.A. PRB, Brussels, Belgium
No Drawing. Filed July 5, 1968, Ser. No. 742,512
Claims priority, application Belgium, July 7, 1967, 701,102
Int. Cl. A01n 9/20
U.S. Cl. 71—105   12 Claims

ABSTRACT OF THE DISCLOSURE

The invention relates to compounds of the formula:

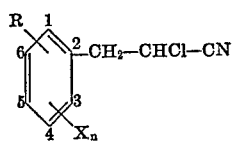
(I)

wherein R represents an alkyl group, X is a halogen atom and $n$ is from 1 to 3 inclusive, the said compounds entering into compositions for regulating plant growth.

---

This invention relates to novel substituted β-chloro-β-cyanoethyl-benzenes, to a process for their production and to their use as agents for regulating plant growth.

According to the present invention we provide compounds of the formula:

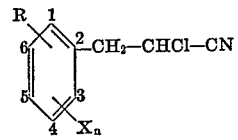

in which R represents an alkyl group, X represents a halogen atom and $n$ is 1, 2 or 3. Preferably R represents an alkyl group having 1 to 3 carbon atoms. X is preferably chlorine. Especially preferred compounds are those in which R occupies the ortho position with respect to the β-chloro-β-cyanoethyl group i.e. the 1-position of the Formula I, $n$ is 1 and the halogen X occupied the 4- or 6-position of Formula I; also those in which R is in the 1-position, $n$ is 2 and the halogen atoms X are in the positions 3 and 4, 4 and 5 or 4 and 6 of the Formula I. Further preferred compounds of Formula I are those in which R is in the 1-position, $n$ is 3 and the halogen atoms X are in the positions 3, 4 and 6 of Formula I.

Examples of preferred compounds of the Formula I include:

2-(β-chloro-β-cyanoethyl)-6-chlorotoluene
2-(β-chloro-β-cyanoethyl)-4-chlorotoluene
2-(β-chloro-β-cyanoethyl-4-chloro-1-ethylbenzene
2-(β-chloro-β-cyanoethyl)-4,6-dichlorotoluene
2-(β-chloro-β-cyanoethyl)-3,4,6-trichlorotoluene We have found that the substituted β-chloro-β-cyanoethylbenzenes of the Formula I are effective as agents for regulating plant growth and that many of them are capable of acting favourably on the yield of some species such as sugar and fodder beet. We have also observed that many of the compounds of the Formula I have an effect on the geotropism of the plants and promote the setting of fruit.

The substituted β-chloro-β-cyanoethylbenzenes of Formula I may be prepared by a reaction analogous to that described by Meerwein (J. prakt. Chem. 152 (1939) 237).

The process for their preparation comprises diazotising an amine of the formula:

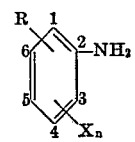
(II)

with nitrous acid at 0° C. in a hydrochloric acid medium, and reacting the resulting diazonium chloride with acrylonitrile in the presence of a catalytic amount of cupric chloride, preferably at ambient temperature, for example 15 to 25° C. or more especially 20 to 25° C. Usually the amount of cupric chloride present will be in the range of 25 to 35 g. of cupric chloride dihydrate per mole of the diazonium chloride.

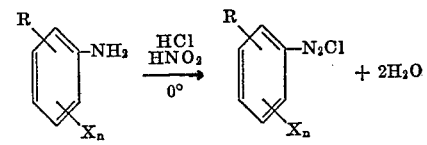

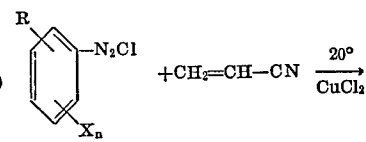

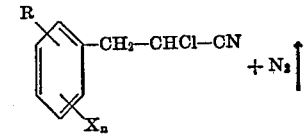

PREPARATIVE EXAMPLE (1) 137.4 g. (1 mol) of 6-chloro-ortho-toluidine base were dissolved in a mixture containing 300 ml. of concentrated hydrochloric acid and 400 ml. of water.

After cooling to 0° C., 70 g. of sodium nitrite (in 50% aqueous solution) were added rapidly. The temperature was kept below 5° C. during the addition.

(2) 60 g. of acrylonitrile were dissolved in 500 ml. of acetone. The previously prepared diazonium chloride solution was added to it with stirring, and also 25 g. of hydrated cupric chloride $CuCl_2 \cdot 2H_2O$.

The mixture was stirred for one hour at 15 to 20° C. and then left to stand for 20 hours at 25° C. The reaction was accompanied by the liberation of nitrogen; the 2-(β-chloro-β-cyanoethyl)-6-chlorotoluene formed separated out as an oil, which was separated from the aqueous phase and then diluted with chloroform.

The solution in chloroform was washed with water until free of acidity and then dried by shaking with anhydrous calcium chloride. Finally, the solvent was evaporated.

The residue was vacuum distilled at 125–130° C./ 0.5 mm.

The resulting product contained 33.10% of chlorine (theoretical percentage:33.14%).

The other compounds of the Formula I may be prepared similarly.

The products according to this invention may be used in the form of an aqueous emulsion prepared by dissolving in an appropriate solvent such as acetone, alcohols, benzene, xylene or mixtures of the latter, and containing ionic and non-ionic surface active agents.

The following composition may be cited as an example of an emulsifiable solution:

250 g. of 2-(β-chloro-β-cyanoethyl)-6-chlorotoluene
30 g. of surface-active agent (e.g. a mixture of a sulfated fatty alcohol and a polyoxyethylenic derivative of an alkylphenol).
300 g. of n-butyl alcohol made up to 1 kg. with xylene.

The products according to this invention may also be prepared for use in any other forms, for example in the form of wettable powders with an appropriate solid mineral carrier and appropriate surface-active agents.

The following composition may be cited as an example of formulation in the form of a wettable powder:

10% by weight of 2-(β-chloro-β-cyanoethyl)-6-chlorotoluene.
3% by weight of surface-active agents (e.g. Na alkylbenzenesulfonates)
3% by weight of dispersing agent (e.g. Na lignosulfonates)
84% by weight of mineral charge (e.g. clay).

The (β-chloro-β-cyanoethyl)-benzenes according to this invention have a different growth-regulating action on plants to that of products such as (β-chloroethyl)-trimethylammonium chloride, or N-dimethylaminosuccinamic acid, which are known to be agents inhibiting plant growth. This difference in action is shown by a substantial difference in the heights and behaviour of plants treated with the different compounds.

Table I shows the results of glasshouse trials with various plants.

These trials involve the application of 2-(β-chloro-β-cyanoethyl)-6-chlorotoluene; a comparison was made, for the same doses, with known agents for inhibiting plant growth.

The treatment consisted in spraying the leaves. The doses applied are shown in percentages by weight of active substance in emulsion.

In each case the measurements are related to a control (untreated plant) to which an arbitrary value of 100 has been given. The average of three repetitions is recorded.

The products used are indicated in Table I by the following symbols:

A: 2-(β-chloro-β-cyanoethyl)-6-chlorotoluene
B: N-dimethylaminosuccinamic acid
C: (β-chloroethyl)-trimethylammonium chloride
—: control.

The results of Table I show that the action of 2-(β-chloro-β-cyanoethyl)-6-chlorotoluene on the growth of various plants is more effective than that of known products in this field. This action is proportional to the dose of active substance used.

Table II shows that treatment of salvias with an emulsion containing 2-(β-chloro-β - cyanoethyl)-6-chlorotoluene in a low concentration causes a considerable growth of the stalk.

To obtain a similar effect with N-dimethylaminosuccinamic acid, which is known to act on plant growth, doses 5 to 10 times as high have been necessary. The effect obtained, however, is still not so marked as when 2-(β-chloro-β-cyanooethyl)-6-chlorotoluene is used.

The salvias were treated by spraying the leaves. The doses are shown as percentages by weight of active substance in emulsion.

The measurements are related in each case to a control (untreated plant) to which an arbitrary value of 1 has been given. The average of several repetitions has been recorded 54 days after treatment.

TABLE II.—GLASSHOUSE TRIAL ON SALVIAS
(Trial 6)

| Product used | Concentration of active substance, percent | Height of— | |
|---|---|---|---|
| | | Plant | Stalk |
| Control | | 1 | 1 |
| A | 0.02 | 0.9 | 1.4 |
| A | 0.01 | 1.1 | 1.2 |
| A | 0.005 | 1.4 | 0.9 |
| B | 0.1 | 1.1 | 1.1 |
| B | 0.05 | 1 | 0.7 |

A: 2-(β-chloro-β-cyanoethyl)-6-chlorotoluene
B: N-dimethylaminosuccinamic acid

The (β-chloro-β-cyanoethyl)-benzenes according to this invention have an effect on plant geotropism.

This effect is illustrated by trial 7 below, carried out in the glasshouse by the application of 2-(β-chloro-β-cyanoethyl)-6-chlorotoluene to Pelargonium.

Thirteen days after the treatment by spraying with an emulsion containing 0.5% of active substance the angle formed by the vertical stalk and the petiole was measured.

TRIAL 7

| | Angle measured |
|---|---|
| Control | 40° 5′ |
| Treated plant | 63° 0′ |

TABLE I.—GLASSHOUSE TRIALS

| Plant | Product used | Concentration of active substance, percent | Interval between treatment and measurement | Height of plant | Trial number |
|---|---|---|---|---|---|
| Solanum lycopersicum L (tomatoes) | | | | 100 | |
| | A | 0.05 | 17 days | 60 | |
| | B | 0.05 | 17 days | 77 | 1 |
| | C | 0.05 | 17 days | 62 | |
| Vivia faba L (beans) | | | | 100 | |
| | A | 0.05 | 26 days | 57 | 2 |
| | C | 0.05 | 26 days | 58 | |
| Apium graveolens L (celery) | | | | 100 | |
| | A | 0.05 | 26 days | 25 | 3 |
| | C | 0.05 | 26 days | 125 | |
| Pelargonium pellatum L (geranium) | | | | 100 | |
| | A | 0.05 | 26 days | 34 | 4 |
| | C | 0.05 | 26 days | 88 | |
| Solanum lycopersicum L (tomatoes) | | | | 100 | |
| | A | 0.025 | 55 days | 38 | |
| | A | 0.0125 | 55 days | 59 | 5 |
| | A | 0.00625 | 55 days | 71 | |

The object of Table III is to show the effect on the setting of fruit as a result of treatment with the ($\beta$-chloro-$\beta$-cyanoethyl)-benzenes according to this invention.

In these trials, 2-($\beta$-chloro-$\beta$-cyanoethyl)-6-chlorotoluene was applied to apple trees (Golden Delicious) at the start of flowering.

A comparison was made, for the same doses, with the known compound ($\beta$-chloroethyl)-trimethylammonium chloride.

The average growth of the trees in cm. was measured; the number of leaves and number of fruit set per tree was counted. The results are an average of several repetitions.

TABLE III

| Product used | Concentration of active substance, percent | Average growth of tree | Number of— Leaves per tree | Fruit set per tree |
|---|---|---|---|---|
| Control | | 38.3 | 40.3 | 0 |
| A | 0.05 | 37.0 | 33.6 | 18.6 |
| C | 0.05 | 38.0 | 30.0 | 0 |

NOTE A=2-($\beta$-chloro-$\beta$-cyanoethyl)-6-chlorotoluene; C=($\beta$-chloroethyl)-trimethylammonium chloride.

Table IV shows the yields per hectare of sugar-beet after treatment at the height of growth with emulsions of 2-($\beta$-chloro-$\beta$-cyanoethyl)-6-chlorotoluene. The yields are expressed in kg. per hectare; the average of four repetitions is given.

The doses applied are expressed in percentages by weight of active substance in the emulsion in the knowledge that 1,000 litres of this emulsion are used per hectare. Every other trial comprised two treatments, the first in May and the second 21 days after the first.

The measurements were taken at harvest.

TABLE IV

| Concentration of active substance | Number of treatments | Weight in kg. hectare |
|---|---|---|
| Control | | 77.680 |
| 0.1 | 1 | 76.880 |
| 0.1 | 2 | 75.520 |
| 0.05 | 1 | 86.480 |
| .05 | 2 | 78.320 |
| 0.025 | 1 | 91.120 |
| 0.025 | 2 | 80.720 |
| At lower concentrations | | (¹) |

¹ Value reduced to that of control.

Analysis of the variance shows that a single treatment of sugar-beet with an emulsion containing 0.025% of active substance has given distinctly significant results. (The comparison was made with the control and the results of the treatments with an emulsion containing 0.1% of active substance.)

The average sugar content per beet was not changed.

Table V shows the yield per hectare of fodder beet after a single treatment at the height of growth (May) with an emulsion containing 0.1% of 2-($\beta$-chloro-$\beta$-cyanoethyl)-6-chlorotoluene.

The results expressed in kg. per hectare represent the average value of several repetitions.

The measurements were taken at harvest.

TABLE V

| Beet | Concentration of active substance, percent | Weight in kg. per hectare |
|---|---|---|
| Control | | 124.000 |
| Treated | 0.1 | 157.000 |

Analysis of the variance shows that this result is very significant.

Comparative tests of the influence on plant growth resulting from the application of various ($\beta$-chloro-$\beta$-cyanoethyl) benzenes according to this invention are illustrated in Table VI.

This shows for test various products the effects on the growth of tomatoes resulting from the application of emulsions containing 0.025% of active substance.

For each test the height of the plants is measured and the internodes are counted. The results constitute an average of several repetitions.

The measurements were taken 40 days after treatment.

TABLE VI

| Products | Average height of plant in cm. | Average number of internodes |
|---|---|---|
| Control | 40.3 | 12 |
| 2-($\beta$-chloro-$\beta$-cyanoethyl)-6-chlorotoluene | 18 | 9.6 |
| 2-($\beta$-chloro-$\beta$-cyanoethyl)-4-chlorotoluene | 22.3 | 10 |
| 2-($\beta$-chloro-$\beta$-cyanoethyl)-4-chloro-1-ethylbenzene | 32.6 | 11.6 |
| 2-($\beta$-chloro-$\beta$-cyanoethyl)-4-6-dichlorotoluene | 28.3 | 11 |
| 2-($\beta$-chloro-$\beta$-cyanoethyl)-3,4,6-trichlorotoluene | 24.3 | 10.6 |

We have also found that the following substituted ($\beta$-chloro-$\beta$-cyanoethyl)-benzenes, in which the substituents on the benzene nucleous do not occupy the especially preferred positions stipulated above, have a destructive action on plants (tomatoes) as a result of the application of emulsions containing 0.025% of active substance, in particular:

2-($\beta$-chloro-$\beta$-cyanoethyl)-5,6-dichlorotoluene
2-($\beta$-chloro-$\beta$-cyanoethyl)-3,5-dichlorotoluene
4-($\beta$-chloro-$\beta$-cyanoethyl)-2,6-dichlorotoluene
4-($\beta$-chloro-$\beta$-cyanoethyl)-2,5-dichlorotoluene
4-($\beta$-chloro-$\beta$-cyanoethyl)-2,3-dichlorotoluene
4-($\beta$-chloro-$\beta$-cyanoethyl)-2,3,6-trichlorotoluene
4-($\beta$-chloro-$\beta$-cyanoethyl)-3-chloro-1-ethylbenzene.

What we claim is:

1. A method for regulating plant growth comprising applying to the plant an effective amount of compound of the formula

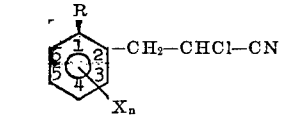

wherein R is an alkyl group of 1 to 3 carbon atoms, $n$ is 1 to 3 and X is chlorine which is situated:

for $n=1$: in the 4 or 6 position;
for $n=2$: in 3 and 4 or 4 and 5 or 4 and 6 positions, respectively; and
for $n=3$: in the 3, 4 and 6 positions.

2. A method in accordance with claim 1 wherein R is methyl or ethyl and chlorine is situated in the 4 and 6 positions when $n=2$.

3. A method in accordance with claim 1 wherein said compound is applied to the plants in admixture with a liquid or solid carrier.

4. A method in accordance with claim 1 wherein said compound is 2-(-chloro-$\beta$-cyanoethyl)-6-chlorotoluene.

5. A method in accordance with claim 1 wherein said compound is 2-($\beta$-chloro-$\beta$-cyanoethyl)-4-chlorotoluene.

6. A method in accordance with claim 1 wherein said compound is 2-($\beta$-chloro-$\beta$-cyanoethyl)-4-chloro-1-ethylbenzene.

7. A method in accordance with claim 1 wherein said compound is 2-($\beta$-chloro-$\beta$-cyanoethyl)-4,6-dichlorotoluene.

8. A method in accordance with claim 1 wherein said compound is 2 - ($\beta$-chloro-$\beta$-cyanoethyl)-3,4,6-trichlorotoluene.

9. Compositions for regulating plant growth comprising an effective amount of compound of the formula

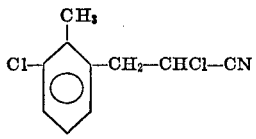

and a liquid or solid carrier.

10. A composition in accordance with claim 9 which includes a surface active agent in sufficient amount for emulsifying said compound.

11. A composition in accordance with claim 9 wherein said composition is wetable powder containing surface active agent and solid carrier.

12. A composition in accordance with claim 9 wherein said composition is emulsifiable liquid containing surface active agent and organic solvent in which said compound is dissolved.

References Cited
UNITED STATES PATENTS

| | | | |
|---|---|---|---|
| 3,285,729 | 11/1966 | Weil | 71—126 X |
| 3,331,865 | 7/1967 | Weil | 71—105 X |

OTHER REFERENCES

Meerwein, J. Prakt. Chem. 152 (1939).

JAMES O. THOMAS, Jr., Primary Examiner

U.S. Cl. X.R.

71—76, 77; 260—465